(12) United States Patent
Ramegowda et al.

(10) Patent No.: US 12,269,529 B2
(45) Date of Patent: Apr. 8, 2025

(54) VEHICLE FRAME AND CROSS-MEMBER ARRANGEMENT

(71) Applicant: Volvo Truck Corporation, Gothenburg (SE)

(72) Inventors: Rasanjaya Ankanahalli Ramegowda, Karnataka (IN); Shreeharsha Akkur Ramabhadraiah, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 372 days.

(21) Appl. No.: 17/785,685

(22) PCT Filed: Jan. 13, 2021

(86) PCT No.: PCT/EP2021/050507
§ 371 (c)(1),
(2) Date: Jun. 15, 2022

(87) PCT Pub. No.: WO2021/151657
PCT Pub. Date: Aug. 5, 2021

(65) Prior Publication Data
US 2023/0052999 A1    Feb. 16, 2023

(30) Foreign Application Priority Data

Jan. 31, 2020   (IN) .............. 202041004355

(51) Int. Cl.
*B62D 21/03* (2006.01)
*B60G 11/30* (2006.01)
(Continued)

(52) U.S. Cl.
CPC .............. *B62D 21/03* (2013.01); *B60G 11/30* (2013.01); *B62D 21/12* (2013.01); *B62D 21/16* (2013.01);
(Continued)

(58) Field of Classification Search
CPC ........ B62D 21/03; B62D 21/12; B62D 21/16; B60G 11/30; B60Y 2200/14; B60K 2015/0636; B60K 15/03
(Continued)

(56) References Cited

U.S. PATENT DOCUMENTS 7,503,586 B2    3/2009  Ramsey
10,000,328 B1 *  6/2018  Leiss ...................... B65D 81/05
(Continued)

FOREIGN PATENT DOCUMENTS

DE    202013004660 U1    5/2013
DE    102017106028 A1    9/2018
(Continued)

OTHER PUBLICATIONS

Intention to Grant for European Patent Application No. 21700546.1, mailed Dec. 14, 2023, 24 pages.
(Continued)

*Primary Examiner* — Amy R Weisberg
*Assistant Examiner* — Dana D Ivey
(74) *Attorney, Agent, or Firm* — Withrow & Terranova, PLLC

(57) ABSTRACT

The invention relates to a vehicle frame comprising first and second parallel frame rails and multiple cross-members connecting the frame rails, wherein the vehicle frame has at least one cross-member with an integrated fluid tank. The at least one cross-member and fluid tank comprises an intermediate tank section with open end portions, where each end portion comprises a sealing flange; tank end caps attachable to seal opposite end portions of the intermediate tank section; wherein each end cap comprises an end cap sealing flange facing a corresponding tank sealing flange at opposite end portions of the intermediate tank; and wherein each tank end cap is provided with a mounting plate facing away from
(Continued)

the intermediate tank section, which mounting plate is arranged to be attached to a frame rail.

14 Claims, 6 Drawing Sheets

(51) Int. Cl.
  *B62D 21/12* (2006.01)
  *B62D 21/16* (2006.01)
  *B60K 15/03* (2006.01)
  *B60K 15/063* (2006.01)
(52) U.S. Cl.
  CPC ...... *B60K 15/03* (2013.01); *B60K 2015/0636* (2013.01); *B60Y 2200/14* (2013.01)
(58) Field of Classification Search
  USPC .......................................................... 296/204
  See application file for complete search history.

(56) References Cited

U.S. PATENT DOCUMENTS

| | | | |
|---|---|---|---|
| 2005/0082814 A1* | 4/2005 | Ramsey | B62D 53/068 |
| | | | 280/793 |
| 2010/0327573 A1* | 12/2010 | Burns | B62D 21/16 |
| | | | 280/830 |

FOREIGN PATENT DOCUMENTS

| | | |
|---|---|---|
| EP | 3378739 A1 | 9/2018 |
| JP | 2018203091 A | 12/2018 |

OTHER PUBLICATIONS

International Search Report and Written Opinion for International Patent Application No. PCT/EP2021/050507, mailed Feb. 25, 2021, 12 pages.

\* cited by examiner

VEHICLE FRAME AND CROSS-MEMBER ARRANGEMENT

This application is a 35 USC 371 national phase filing of International Application No. PCT/EP2021/050507, filed Jan. 13, 2021, which claims the benefit of Indian Patent Application number 202041004355, filed Jan. 31, 2020, the disclosures of which are incorporated herein by reference in their entireties.

TECHNICAL FIELD

The invention relates to a vehicle frame arrangement, which frame arrangement comprises a detachable cross-member with an integrated tank.

BACKGROUND

Conventional vehicle frames for heavy duty vehicles comprise two frame rails spaced from one another and secured to one another using cross-members. It is well known to suspend various components, such as fuel tanks, battery packs and compressed air tanks for heavy duty vehicles from the frame. These components may be bolted to the frame rails or cross members or supported on subassemblies which in turn are hung from or otherwise supported from the frame. In such vehicles the components and their support arrangements add weight to the vehicle, and in some applications take up valuable space.

US2010/327573 suggests a solution to the above problems, wherein an air tank and a cross-member is combined into a single component. A cylindrical tank section is welded onto a pair of back plates which can in turn be bolted to the frame.

One problem with the above solutions is that the tank section is welded directly onto the plates used for mounting. These welds will be subjected to severe loads as the frame rails bend during operation of the vehicle. This will eventually cause the welds to fail and the tank will begin to leak along failed weld sections. A further problem is that the suggested arrangement is welded to form a single component, so that the entire cross-member must be replaced upon failure. Finally, as the cylindrical tank section is welded directly onto the mounting plates, the bolts used for fixing the cross-member to the frame must be positioned outside the outer periphery of the tank. A problem with this arrangement is that the space required for mounting the cross-member onto the frame rails will be relatively large and can also limit the maximum diameter of tank.

SUMMARY

An object of the present disclosure is to provide an improved vehicle frame and cross member arrangement that addresses at least some of the above issues.

According to a first aspect, the invention relates to a vehicle frame comprising first and second parallel, longitudinal frame rails and multiple cross-members connecting the frame rails. The vehicle frame is provided with at least one cross-member with an integrated fluid tank, instead of or in combination with conventional cross-members.

A cross-member with an integrated fluid tank comprises an intermediate tank section with open end portions, where each open-end portion comprises a sealing flange, and tank end caps attachable to seal opposite end portions of the intermediate tank section. Each end cap comprises an end cap sealing flange facing a corresponding tank sealing flange at opposite end portions of the intermediate tank section, wherein each tank end cap is provided with a mounting plate facing away from the intermediate tank section, which mounting plate is arranged to be attached to a frame rail on opposite sides of the vehicle.

The intermediate tank section and the tank end caps have facing sealing flanges with a first interface, which first interface comprises a matching hole grid pattern arranged to orientate the facing flanges relative to each other. The hole grid pattern can have a "poka-yoke" type feature to ensure that the facing flanges are mounted in a particular angular position relative to each other. One example of such a feature is an unsymmetrical hole offset on the sealing flanges to align the intermediate tank section flanges with respect to the respective end cap flange. This can be achieved by positioning holes arranged on a set pitch circle so that at least one hole is offset from an equidistant hole distribution around the pitch circle.

Alternatively, the intermediate tank section and the tank end caps have facing flanges with an alternative first interface, which first interface comprises mating projections and recesses arranged on facing flanges. In this way, the facing flanges must be orientated in a particular angular position relative to each other in order to allow the flanges to be assembled.

Further, the mounting plates on the end caps have a second interface comprising a hole pattern arranged to match a frame rail hole grid pattern. This allows the assembled cross-member to be located at any suitable position where the mounting plate interfaces line up with the frame rail hole grid pattern. If desired, the cross-member can be re-positioned both in the longitudinal and the vertical direction, where allowed by the frame rail hole grid pattern. According to a further example, a cross-member with an integrated tank can be made detachable and replaceable by fixing the mounting plates to the frame rails using removable fasteners such as bolted or screw-and-nut fasteners. In addition, as the mounting plates are separated from the tank end caps, the footprint of the mounting plate on the respective frame rail is reduced as the size of the mounting plate can be substantially the same as the cross-sectional area of the integrated tank.

According to a further example, the intermediate tank section has a front and/or a rear interface comprising a hole pattern arranged to match a hole grid pattern on at least one auxiliary component. This arrangement allows the cross-member to be used as a support structure for a vehicle axle or wheel suspension component. Alternatively, the front/rear interfaces can be used for mounting one or more additional fluid tanks, e.g. tanks for compressed air, hydraulic fluids or gaseous/liquid fuels, such as LNG, CNG or diesel fuels. Energy storage units, such as battery packs, or fuel cell components can also be supported by one or more integrated tank cross-members.

A cross-member with an integrated cross-member as described in the above examples is preferably mounted in the transverse direction of the frame, at right angles to the longitudinal frame rails. However, according to an alternative example, one or more such cross-members can be mounted at an acute angle relative to a transverse vertical plane through the frame rails. This acute angle is preferably selected to be 20° or less. An angled mounting of a cross-member with an integrated tank can be used in a position where a transverse arrangement cannot be fitted. This can be the case where one or more existing frame rail mounted components or axle parts are placed so that there is no space for a transverse cross-member or that the frame rail hole pattern is occupied or inaccessible.

According to a second aspect, the invention relates to a vehicle comprising a vehicle frame as described above, wherein the vehicle frame comprises at least one cross-member with an integrated tank.

Providing a vehicle frame with a cross-member according to the invention involves a number of advantages. The integration of a tank as described above utilizes a normally unoccupied area or volume between the longitudinal frame rails. This saves space and frees up space for other components, such as traction batteries, along the outer sides of the frame rails where tanks such as air tanks would normally be mounted.

Further, a cross-member according to the invention is provided with mounting plates adapted to interface with available sections of hole grid patterns provided along the frame rails. This allows the assembled cross-member to be located at any suitable position where the mounting plate interfaces line up with the frame rail hole grid pattern. If desired, the cross-member can be positioned or re-positioned both in the longitudinal and the vertical direction of the frame rails, where this is allowed by the frame rail hole grid pattern. Also, by separating the end caps and the mounting plates a predetermined distance, the footprint of the cross-member on the frame rails is reduced. According to a further example, a cross-member with an integrated tank can be made detachable and replaceable by fixing the mounting plates to the frame rails using removable fasteners such as bolted or screw-and-nut fasteners.

A cross-member according to the invention can also be provided with front and/or rear interfaces, comprising vertical surfaces with a suitable hole grid pattern in the same way as the frame rails. This arrangement allows the cross-member to be used as a support structure for a vehicle axle or wheel suspension component. Alternatively, the front/rear interfaces can be used for mounting one or more additional fluid tanks, e.g. tanks for compressed air, hydraulic fluids or gaseous/liquid fuels, such as LNG, CNG or diesel fuels.

Further, the end caps with mounting plates provided for transverse mounting of the cross-member can be replaced by end caps having angled mounting plates. This allows the cross-member to be mounted at an angle relative to a transverse vertical plane through the frame rails. An angled mounting of a cross-member with an integrated tank can be used in a position where a transverse arrangement cannot be fitted. This can be the case where one or more existing frame rail mounted components or axle parts are placed so that there is no space for a transverse cross-member or that the frame rail hole pattern is occupied or inaccessible.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
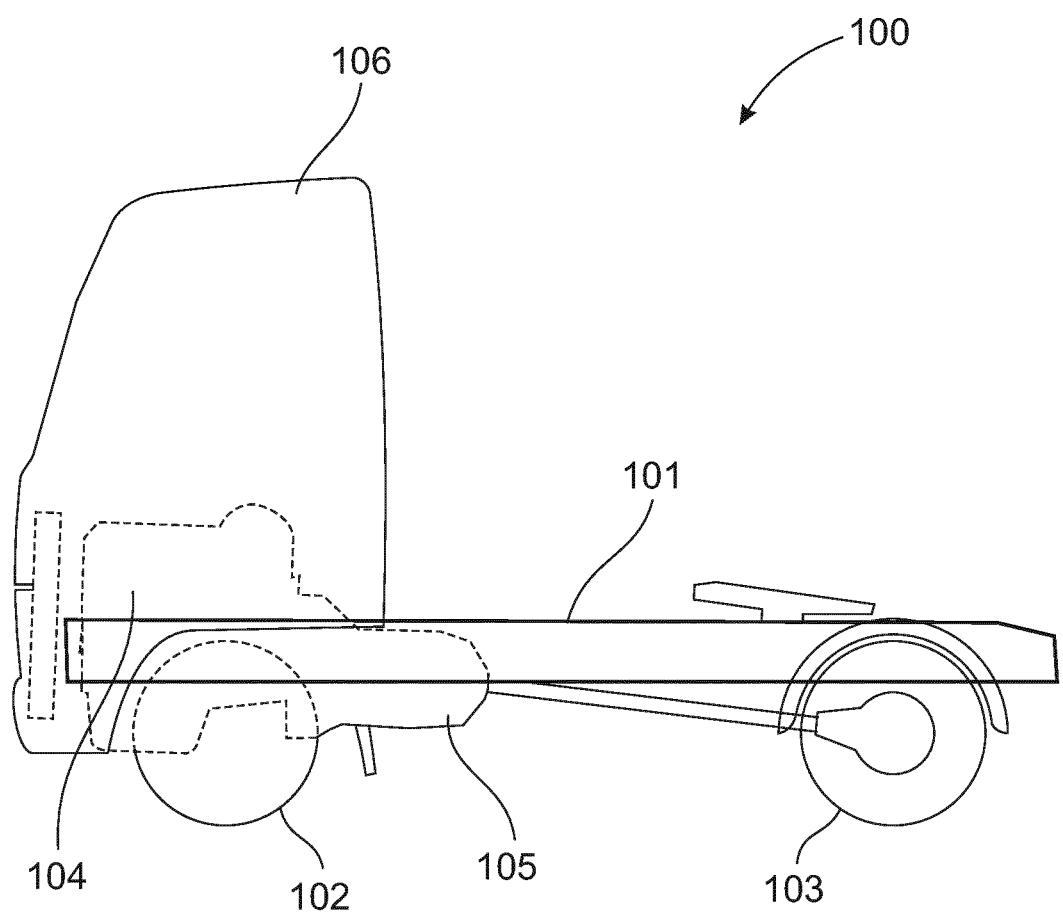
FIG. 1 shows a schematically indicated vehicle with a vehicle frame.

FIG. 1 shows a schematically indicated vehicle 100 with a vehicle frame 101 according to the invention. The vehicle 100 shown in FIG. 1 is provided with front wheels 102 on a steerable front axle and rear wheels 103 on a driven rear axle. The vehicle 100 is further provided with propulsion means such as an internal combustion engine (ICE) 104 connected to a transmission 105, such as an automated manual transmission (AMT), for transmitting torque to a vehicle drive axle (not shown). The ICE 104 is connected to a radiator arrangement for cooling engine coolant and oil from the ICE 104. The vehicle frame 101 referred to can also be adapted for vehicles with alternative propulsion means, such as an electric motor.

Figure 2:
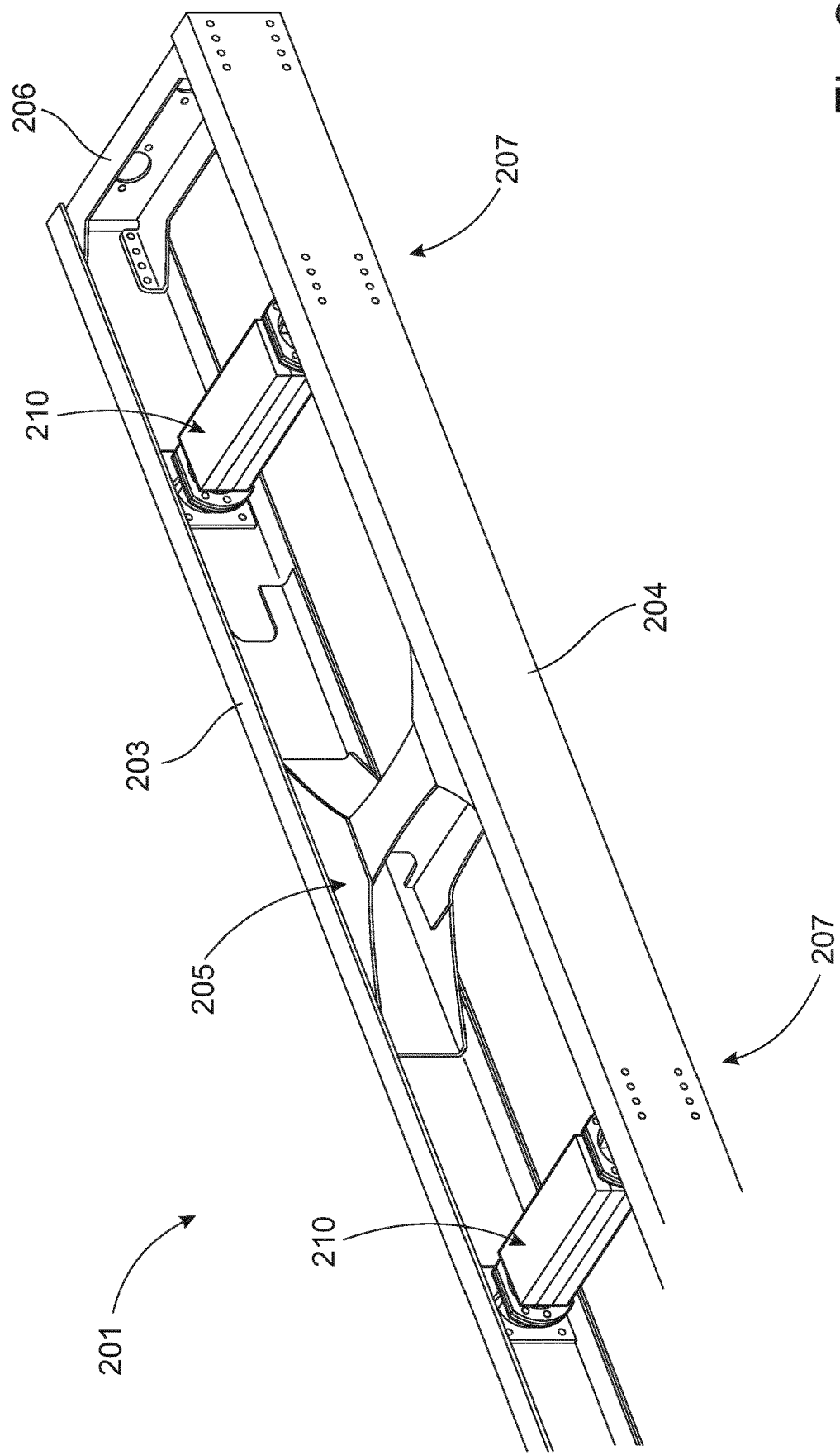
FIG. 2 shows a schematic indicated vehicle frame with cross-members.

FIG. 2 shows a schematic indicated vehicle frame 201 with cross-members 210 according to the invention. FIG. 2 shows a rear section of the vehicle frame 201, which frame comprises a first longitudinal frame rail 203, a parallel second longitudinal frame rail 204, at least one structural cross-member 205 (one shown), a rearmost cross-member 206, and two cross-members 210 with integrated tanks. The number of cross-members with integrated tanks can be varied dependent on the size of the vehicle frame and the requirement for tanks and/or auxiliary components for the vehicle frame in question.

Figure 3:
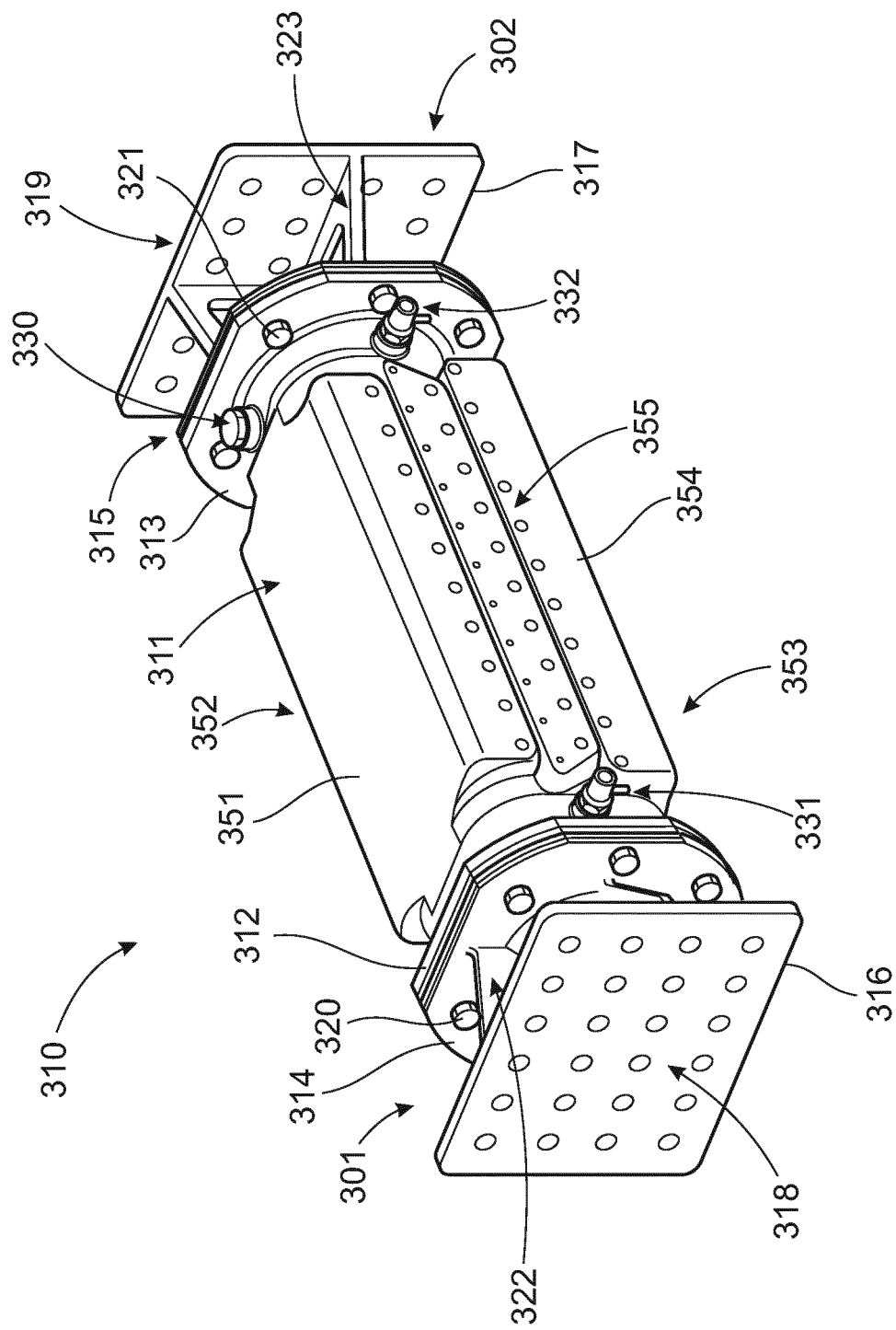
FIG. 3 shows a schematically indicated cross-member.
Figure 4:
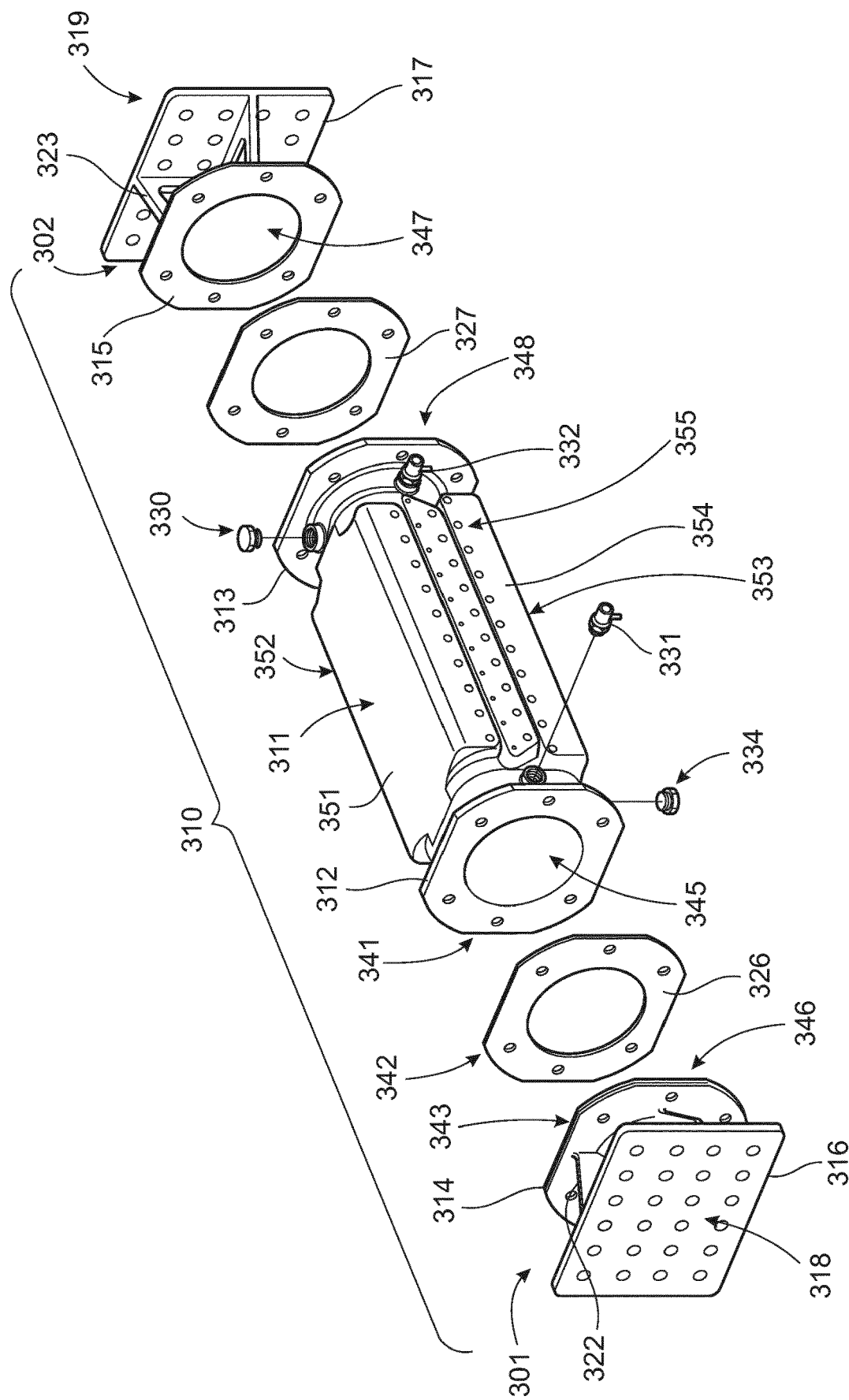
FIG. 4 shows an exploded view of the cross-member in FIG. 3.

FIG. 3 shows a schematically indicated assembled cross-member 310 according to the invention. FIG. 4 shows an exploded view of the cross-member in FIG. 3. The cross-member has an integrated fluid tank comprising an intermediate tank section 311 with open end portions 345, 348, where each open-end portion comprises a sealing flange 312, 313. Tank end caps 301, 302 attachable to seal opposite end portions of the intermediate tank section 311. Each end cap 301, 302 comprises an end cap sealing flange 314, 315 facing the corresponding tank sealing flange 312, 313 at opposite end portions of the intermediate tank section 311, wherein each tank end cap 301, 302 is provided with a mounting plate 316, 317 facing away from the intermediate tank section 311, which mounting plate 316, 317 is arranged to be attached to a frame rail on opposite sides of the vehicle.

Figure 6:
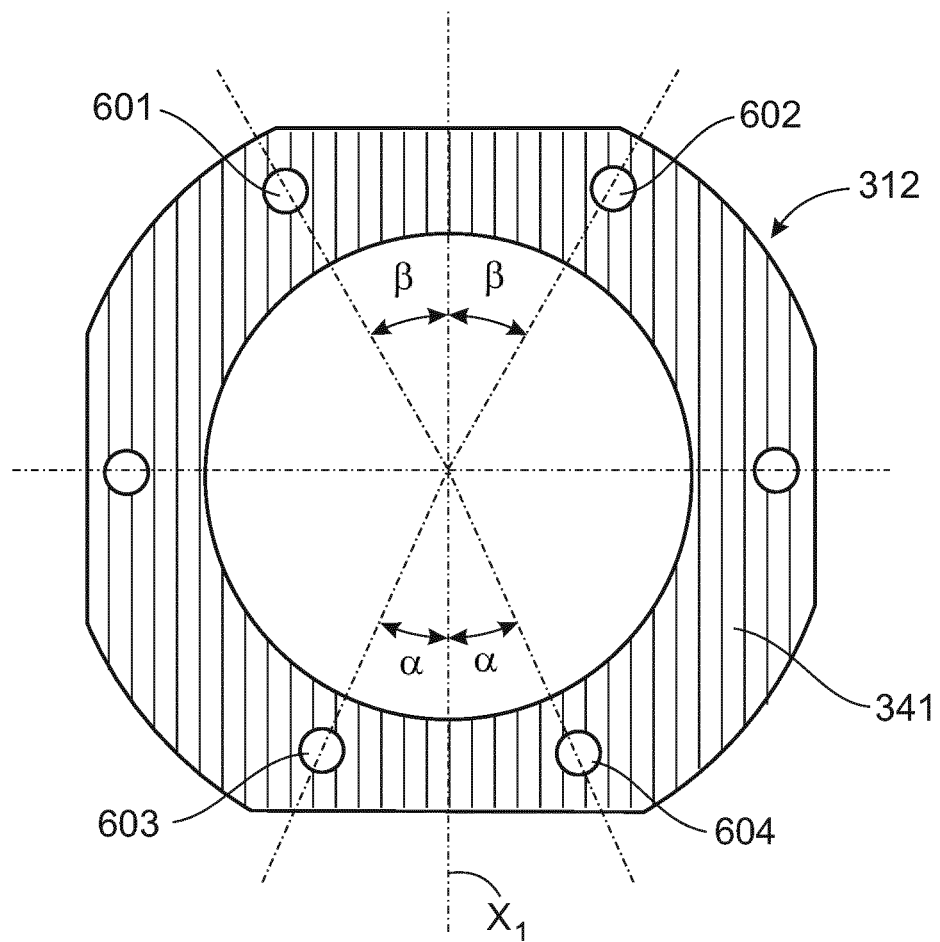
FIG. 6 show a front view of an intermediate tank section in FIG. 4.

The intermediate tank section 311 and the tank end caps 301, 302 are joined by facing sealing flanges 312, 313, 314, 315 and intermediate sealing gaskets 326, 327 provided with a first interface 341, 342, 343, which first interface comprises a matching hole grid pattern arranged to orientate the facing flanges relative to each other (see FIG. 6). The hole grid pattern can have a "poka-yoke" type feature to ensure that the facing flanges are mounted in a particular angular position relative to each other. One example of such a feature is an unsymmetrical hole offset on the sealing flanges and gaskets to align the intermediate tank section flanges 312, 313 with respect to the respective end cap flange 314, 315. As shown in FIG. 6, one way of achieving this feature is to positioning holes arranged on a set pitch circle so that at least one hole is offset from an equidistant hole distribution around the pitch circle. FIG. 6 is a front view of one of the sealing flanges 312 on the intermediate tank section 311 in FIG. 4. In this example, the sealing flange 312 comprises six through holes on the same set pitch circle, wherein a first pair of holes 601, 602 are located at identical first angles $\beta$ relative to a vertical axis X1 through the centre of the pitch circle. A second pair of holes 603, 604 are located at identical second angles $\gamma$ relative to the vertical axis $X_1$. This arrangement of the holes provides an unsymmetrical hole offset which requires the facing sealing flanges and the gaskets to be angularly aligned with each other to allow assembly. FIG. 6 further indicates that the first interface 341 of the respective flange can be provided with a suitable pattern in order to improve the sealing properties of the seal between the flanges and the sealing gaskets. In this example, the pattern comprises parallel ribs or splines. However, the invention is not limited to this pattern.

The intermediate tank section 311 and the tank end caps 301, 302 are joined by removable fasteners, such as screw-and-nut fasteners. As opposed to welded joints, the joints used in this example are allowed to yield a predetermined amount when subjected to severe loads as the frame rails bend during operation of the vehicle. This allows the integrity of the tank to be maintained under loads which would cause welded joints to fracture or crack.

The end cap flange 314, 315 and mounting plates 316, 317 are joined by structural support members 322, 323 extending from a respective outward facing surface of each end cap flange 314, 315 to a corresponding inward facing surface on each mounting plate 316, 317. In the example the end cap flanges 314, 315, the mounting plates 316, 317 and the structural support members 322, 323 are welded together into individual units. As shown in FIG. 4, a sealing gasket 326, 327 is provided between the respective tank sealing flanges 312, 313 and the end cap sealing flange 314, 315. The sealing flanges and their intermediate sealing gaskets are assembled using removable fasteners such as screw-and-nut fasteners 320, 321.

As schematically indicated in FIG. 4, the intermediate tank section 311 has a cylindrical internal cavity with a respective first circular opening 345, 348 at each end. Each first circular opening 345, 348 is matched by identical cylindrical openings 346, 347 in the respective end cap flanges 314, 315. The ends of the intermediate tank section 311 are sealed by the tank end caps 301, 302, which end caps comprise a hemi-spherical or part-hemispherical surface facing the intermediate tank section 311. When assembled the intermediate tank section 311 and the tank end caps form a closed cavity that can be pressurized or filled by a liquid.

Further, the mounting plates 316, 317 on the end caps have a second interface 318, 319 comprising a hole pattern arranged to match a frame rail hole grid pattern (not shown). This allows the assembled cross-member to be located at any suitable position where the mounting plate 316, 317 interfaces 318, 319 line up with the frame rail hole grid pattern. If desired, the cross-member 310 can be re-positioned both in the longitudinal and the vertical direction, where allowed by the frame rail hole grid pattern. The cross-member 310 with its integrated tank is detachable and replaceable by fixing the mounting plates 316, 317 to the frame rails using removable fasteners such as bolted or screw-and-nut fasteners. In addition, as the mounting plates 316, 317 are separated from the tank end caps 301, 302 the footprint of the mounting plate 316, 317 on the respective frame rail is reduced as the size of the mounting plate can be substantially the same as the cross-sectional area of the integrated tank.

The intermediate tank section 311 in FIGS. 3 and 4 has an upper surface 351, a lower surface 353, a rear interface 352 and a front interface 354. The front and rear interfaces 352, 354 comprise a hole pattern 355 arranged to match a hole grid pattern on at least one auxiliary component. This arrangement allows the cross-member to be used as a support structure for a vehicle axle or wheel suspension component. Alternatively, the front/rear interfaces can be used for mounting one or more additional fluid tanks, e.g. tanks for compressed air, hydraulic fluids or gaseous/liquid fuels, such as LNG, CNG or diesel fuels. Energy storage units, such as battery packs, or fuel cell components can also be supported by one or more integrated tank cross-members.

As shown in FIGS. 3 and 4, the intermediate tank section 311 is provided with a number of vales 330, 331, 332. As this example relates to an air tank, the intermediate tank section 311 has a first valve 330 connected to a source of pneumatic pressure (not shown). The intermediate tank section 311 also has one supply valve 331, 332 at each end in order to supply adjacent component parts (not shown), such as air bellows and/or brakes, with compressed air. FIG. 4 also indicates an optional valve 334 that allows the air tank shown in the figure to be connected to a further air tank.

Figure 5:
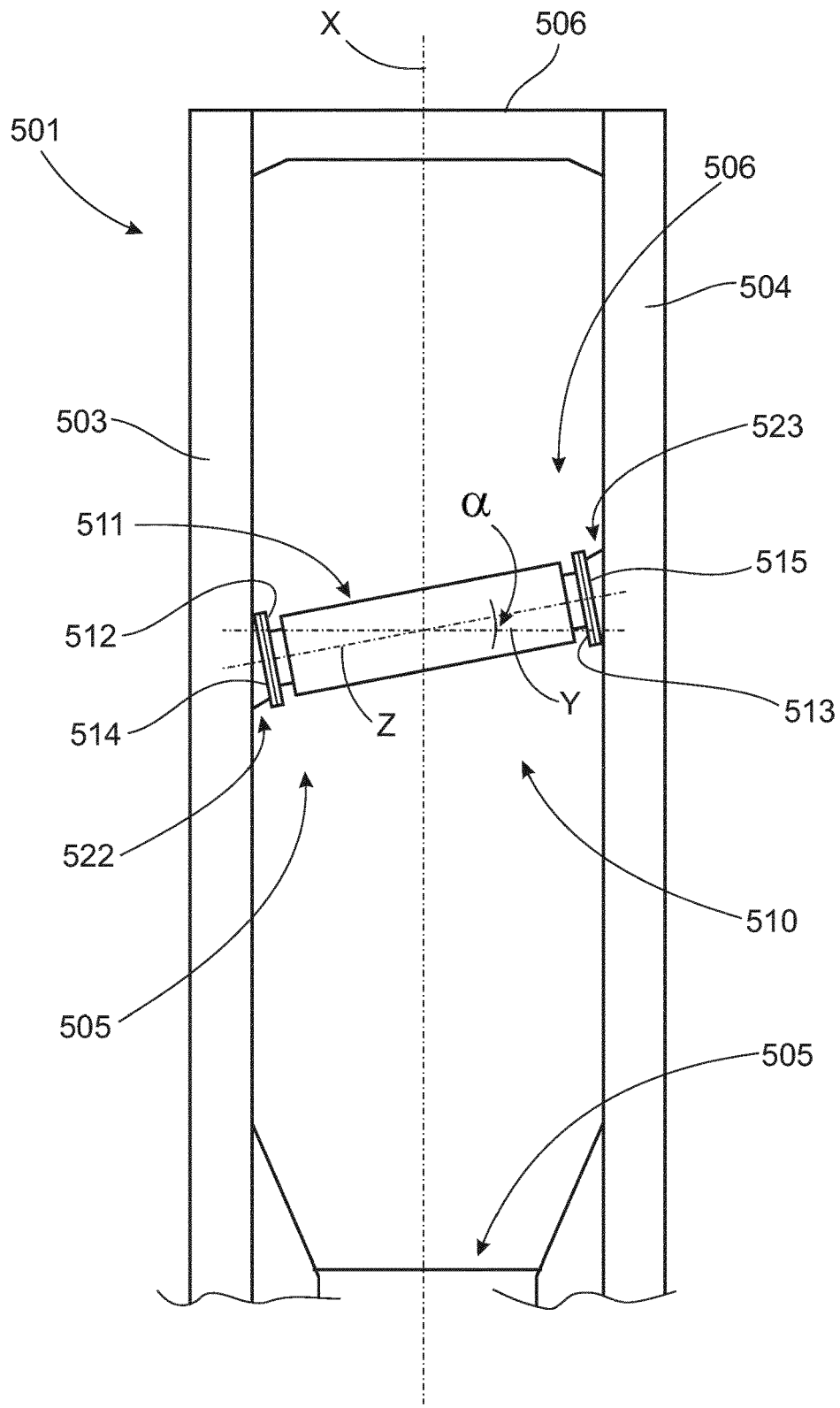
FIG. 5 shows a schematically indicated vehicle frame comprising an angled cross-member.

FIG. 5 shows a schematically indicated, alternative vehicle frame 501 comprising an angled cross-member 510 with an integrated tank. FIG. 5 shows a schematic indicated vehicle frame 501 with an alternative cross-member 510 according to the invention. FIG. 5 shows a rear section of the vehicle frame 501, which frame comprises a first longitudinal frame rail 503, a parallel second longitudinal frame rail 504, at least one structural cross-member 505 (one shown), a rearmost cross-member 506, and a cross-member 510 with an integrated tank. The frame rails 503, 504 are substantially parallel to the longitudinal axis X of the vehicle frame 501. The number of cross-members with integrated tanks can be varied dependent on the size of the vehicle frame and the requirement for tanks and/or auxiliary components for the vehicle frame in question.

The cross-member 510 has an integrated fluid tank comprising an intermediate tank section 511 comprises a sealing flange 512, 513 at opposite end portions of the intermediate tank section 511. Each end cap 505, 506 comprises an end cap sealing flange 314, 315 faces a corresponding tank sealing flange 512, 513 at opposite end portions of the intermediate tank section 511, wherein each tank end cap 505, 506 is provided with a mounting plate (not shown; see FIG. 3) facing away from the intermediate tank section 511. The end cap flange 514, 515 and mounting plates are joined by structural support members 522, 523 extending from a respective outward facing surface of each end cap flange 514, 515 to a corresponding inward facing surface on each mounting plate. The mounting plates are arranged to be attached to a frame rail on opposite sides of the vehicle.

Compared to the embodiment of FIG. 3, the cross-member 510 shown in FIG. 5 can retain all the component parts used in the cross-member 310 shown in FIG. 3, except for the structural support members 522, 523 which provide the desired angled arrangement of the cross-member 510.

The embodiment of FIG. 5 differs from the embodiment of FIG. 2 in that the cross-member 510 is angled relative to a transverse axis Y located at right angles to the longitudinal axis X of the frame 501. The cross-member 510 is mounted at an acute angle $\alpha$ relative to a transverse axis Y. This acute angle is preferably selected to be 20° or less. An angled mounting of a cross-member with an integrated tank can be used in a position where a transverse arrangement cannot be fitted. This can be the case where one or more existing frame rail mounted components or axle parts are placed so that there is no space for a transverse cross-member or that the frame rail hole pattern is occupied or inaccessible.

The invention should not be deemed to be limited to the embodiments described above, but rather a number of further variants and modifications are conceivable within the scope of the following patent claims.

The invention claimed is:

1. A vehicle frame comprising first and second parallel frame rails and multiple cross-members connecting the first and second frame rails, wherein the vehicle frame has at least one cross-member with an integrated fluid tank, wherein the at least one cross-member with integrated fluid tank comprises:
- an intermediate tank section with open end portions, wherein each end portion comprises a sealing flange; and
- tank end caps removably attached to the intermediate tank section to seal opposite end portions thereof;
- wherein each tank end cap comprises an end cap sealing flange facing a corresponding tank sealing flange at opposite end portions of the intermediate tank; and
- wherein each tank end cap is provided with a mounting plate facing away from the intermediate tank section, the mounting plate arranged to be attached to one of the first and second frame rails.

2. The vehicle frame of claim 1, wherein the intermediate tank section and the tank end caps have facing sealing flanges with a first interface, wherein the first interface comprises a matching hole grid pattern arranged to orientate the facing flanges relative to each other.

3. The vehicle frame of claim 2, wherein the first interface comprises a matching hole grid pattern comprising an unsymmetrical hole offset on the facing flanges.

4. The vehicle frame of claim 1, wherein the intermediate tank section and the tank end caps have facing flanges with a first interface, wherein the first interface comprises mating projections and recesses arranged to orientate the respective facing flanges relative to each other.

5. The vehicle frame of claim 1, wherein the facing sealing flanges have sealing surfaces with vertical splines in contact with an intermediate sealing gasket.

6. The vehicle frame of claim 1, wherein the mounting plates have an interface configured to face one of the first frame rail or the second frame rail, the interface comprising a hole pattern arranged to match a frame rail hole grid pattern.

7. The vehicle frame of claim 1, wherein the integrated fluid tank is an air tank.

8. The vehicle frame of claim 1, wherein the intermediate tank section has a front interface comprising a hole pattern arranged to match a hole grid pattern on at least one auxiliary component.

9. The vehicle frame of claim 8, wherein the auxiliary component is an additional fluid tank or a suspension component.

10. The vehicle frame of claim 1, wherein the intermediate tank section has a rear interface comprising a hole pattern arranged to match a hole grid pattern on at least one auxiliary component.

11. The vehicle frame of claim 1, wherein at least one cross-member is mounted at an acute angle relative to a transverse vertical plane through the first and second frame rails.

12. The vehicle frame of claim 11, wherein the at least one cross-member is mounted at an acute angle that is less than 20°.

13. The vehicle frame of claim 1, wherein at least one cross-member is mounted to the frame rails by removable fasteners.

14. A vehicle comprising the vehicle frame of claim 1.

* * * * *